Jan. 12, 1932.  J. SACHS  1,841,213
ELECTRIC METER PROTECTING CABINET
Original Filed Aug. 13, 1925    2 Sheets-Sheet 1
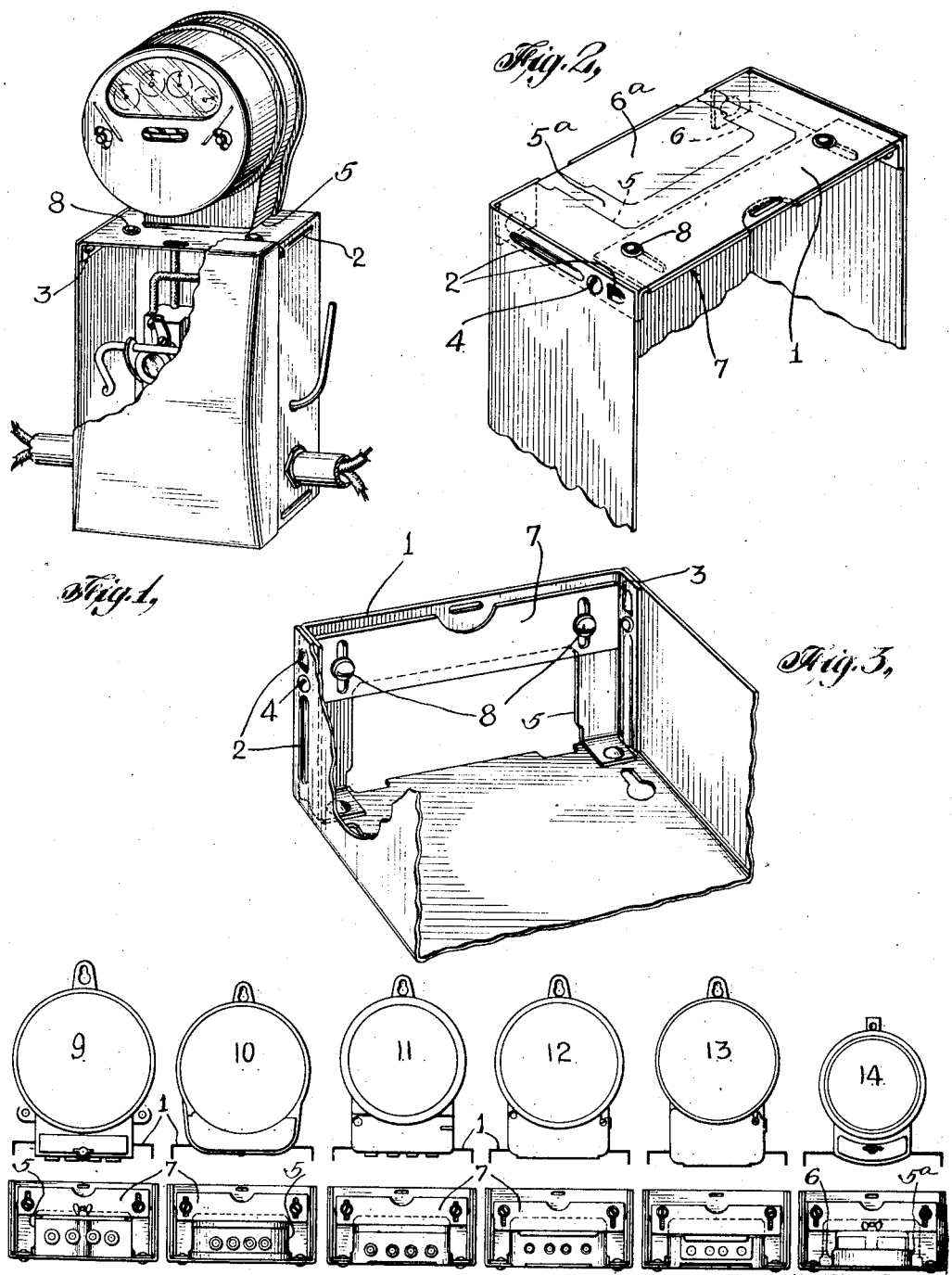

Jan. 12, 1932.　　　　J. SACHS　　　　1,841,213
ELECTRIC METER PROTECTING CABINET
Original Filed Aug. 13, 1925　　2 Sheets-Sheet 2
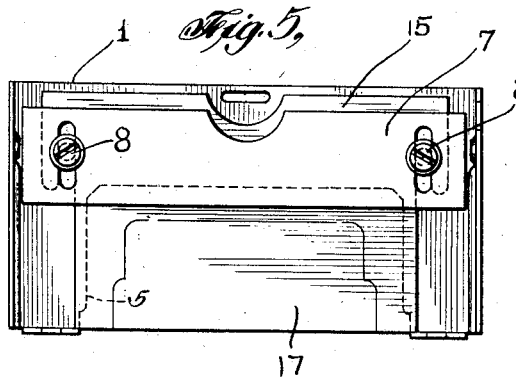
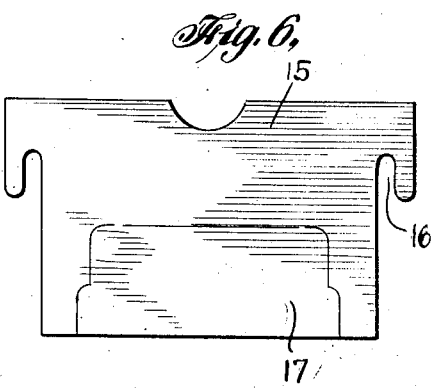
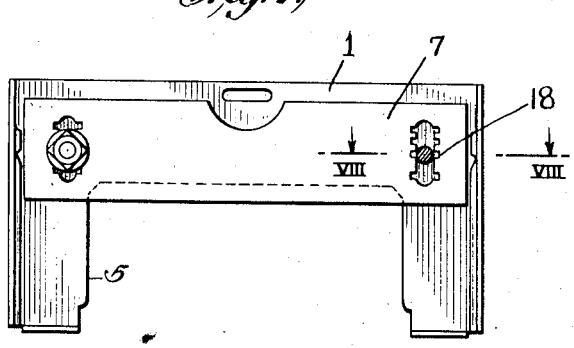
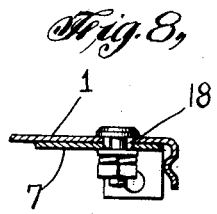
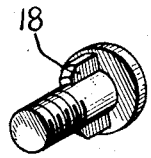
INVENTOR
BY
ATTORNEY Patented Jan. 12, 1932

1,841,213

UNITED STATES PATENT OFFICE

JOSEPH SACHS, OF WEST HARTFORD, CONNECTICUT

ELECTRIC METER PROTECTING CABINET

Application filed August 13, 1925, Serial No. 49,896. Renewed November 9, 1931.

The object of the invention is to save expense in the house entrance equipment of metered electric services, where the meter and main switch or other parts on the supply side of the meter are required to be armor-clad or protected against tampering, and more particularly in that class of protected installations in which the terminal chamber of the meter is protected by projecting into the interior of the sealed metal box or casing which encloses the main entrance switch or the fuses. In such apparatus as heretofore made, the end wall of the box is formed with a notch or opening cut to fit the particular meter chamber which was to project into it, and the accommodation of such box to the many different shapes and sizes of meter terminal chambers was accomplished by making such end wall, or at least a portion of it, removable so that it could be taken out and substituted by any one of many other end walls or portions of end walls each of which had a different shape of opening cut in it to fit some particular meter terminal chamber. This has been the common way of connecting a given switch box to any kind of meter terminal chamber, by a theft-proof junction, but this way was expensive, particularly for the manufacturer of the boxes, who was obliged to not only make all these specially cut parts but was also obliged to tie up his capital in keeping in stock the whole assortment, and it involved a like expense on the dealers and installers of these boxes for similar reasons. The expense as well as the inconvenience of the described practice is eliminated according to this invention by providing a single wall structure which is easily adjusted to accommodate satisfactorily any one of various meters on the market or in common use and which can be made very cheaply, the advance in cost over a non-adjustable end wall being negligible compared to the substantial savings which are accomplished.

The improvement is made possible by my discovery that of all of the standard meters of the type referred to, except one, the terminal chambers are of such shape and width that they can be entered, more or less, but yet sufficiently, into an opening of a particular width provided of course that this opening is of sufficient depth to accommodate the depth of the deepest chamber. The degree to which they will enter varies with the particular shape or contour of the various chambers, but in each case the penetration is enough to occupy the full width of the opening, which is all that is necessary. I utilize this discovery by making the meter-receiving opening in the box, or the removable end wall or other portion thereof of the particular width referred to and of the maximum depth that is necessary and by providing such opening with a reducer plate, which can be adjusted depthwise of the box or opening so as to close up the gap when chambers of less than maximum depth are entered therein and also and by making other provisions for the special accommodation of the one smaller meter, above referred to as the single exception, or for others like it. Such a wall structure can be cheaply produced as above stated and serves all the purposes of the more elaborate system now in use.

In accordance with the foregoing, the invention consists in the principle of arrangement and general design, represented in its preferred form in the accompanying drawings, wherein—

Figure 1 is a broken out perspective of a service entrance switch and meter having the invention applied;

Figure 2 an enlarged perspective of the end wall of the box when serving as a blank end wall;

Figure 3 an interior perspective of the same construction when adjusted to accommodate a particular style of meter chamber.

Figure 4 represents a series of different styles of meters illustrating the adjustments for accommodating each of them.

Figures 5 and 6 illustrate an additional closure plate and its use;

Figure 7 illustrates a modification in the adjustment means for the reducer plate, Figure 8 being a section thereof on line VIII—VIII; and Figure 9 is an enlarged perspective of the adjusting screw.

The box may be assumed to be constructed as customary for service entrance installations and may enclose the usual switch and fuse, or either alone, and the switch may be of any design and have the usual exterior operating handle as shown. The box will be understood to be secured to the wall of the building or other support, and the meter directly adjacent to it and usually above it, with its terminal chamber projecting into the interior of the box through the appropriate opening and with the service wires entering, and the load wires leaving, the box through appropriate conduits or pipes fixed in the box walls and with all the connections between the switch and meter located and made within the box, so that when the cover of the latter is closed and sealed, as shown in Fig. 1, all the service side parts will be shut up and protected. The arrangement referred to is common in the art as above stated and needs no detailed description.

The wall through which the terminal chamber of the meter projects into the box is herein, for convenience, termed the end wall, but without limitation to its relation to the rest of the box. This wall is preferably removably attached to the box body so that it can be taken out when the meter connections are being made. This is desirable as a matter of convenience, and the same convenience will obviously be served whether the whole end wall of the box is removed, or merely a part or section of it. In the present case, the whole wall, marked 1, is removable and is connected to the box side walls by means which enable the removal to be easily made.

This connection comprises the ribs and lugs 2 pressed into the box walls which fit corresponding grooves and holes 3 formed in the side flanges of the end wall. This means of attachment is in accordance with the disclosure of my prior Patent 1,458,728; the wall can only be removed by opening the box cover; but other wall connections may also be used; screws are also used in the case in hand, as shown at 4, to secure the end wall in place. When only a section of the whole wall is removable corresponding provisions can of course be made for the secure attachment of the removed portion, so that the connections to the meter can be made without the inconvenience which the presence of the wall would produce. But as above stated the removability of the end wall is preferable only and not essential to obtain the principal benefits of the invention. For the purpose of this specification and the claims a part of a wall, less than the whole wall, is included within the term end wall.

The meter-receiving opening 5 in the end wall 1 may be and preferably is initially occupied by a knockout section 5ª, which is joined to the rest of the wall by a line of weakness, or a partially cut line as customary for knockouts. Preferably a second interior knockout section 6ª is similarly formed within the first. The knockout section 6ª, when removed, forms an opening 6. I do not herein broadly claim as part of my present invention a meter service box end wall having knockout sections therein for providing meter receiving openings, as this forms the subject matter of my copending application for Box for Enclosing Electrical Appurtenances, Ser. No. 578,342 filed July 29, 1922.

When the box is designed for the meters hereinafter mentioned, the width of the opening 5 left in the end wall by removing the knockout section 5ª is 4$\frac{7}{8}$ inches, and the depth, i. e. the dimension perpendicular to the box back wall, is 2$\frac{1}{16}$th inches; said width is the particular width above referred to which will be fully occupied by practically all of the various styles of meter terminal chambers, and the depth just stated is equal to or slightly greater than the maximum depth of any terminal chamber that will fit an opening of this width. When the interior knockout 6 only is removed, the width of the opening at its widest part is 3$\frac{1}{8}$ inches and its depth 1$\frac{7}{8}$ inches. These dimensions, and also the particular shape of this opening, are suited to fit the single particular style of meter noted above as the single exception. When neither knockout section is removed, the wall resembles the usual blank end wall, Fig. 2, commonly supplied for closing the open ends of these boxes and can be used for the same purpose.

For changing the effective depth of the opening 5 I provide a shutter or reducer plate 7. In accordance with the invention the reducer plate 7 is relatively adjustable, and it is secured in relation to the end wall in any suitable way as for instance by slot and screw connections directly clamping it to the inner face of the wall as indicated at 8. When this kind of adjustment is used the threaded holes in the wall are bossed outwardly as shown in Figure 2 so as to make a long screw hole in which the ends of the screws will not be accessible for turning so as to be releasable from the exterior. The range of depthwise adjustment of the reducer plate is sufficient, on the one hand, to uncover the whole of the larger opening 5 and, on the other, to cover as much of it as may be necessary for accommodating the shallowest meter chamber that will fit that larger opening. The round notch on the outer edge of the reducer plate is merely to provide clearance for the usual seal or locking device which is commonly passed through the hole in the end wall and a corresponding hole in the box cover.

Fig. 4 shows several of the different styles of meters in connected relation to the box and illustrates how they all cooperate with the new end wall structure to make a proper junction. The different positions of the reducer plate will be noted. It will be observed that meters Nos. 9 and 13, known in the trade as Westinghouse 0^A and Sewickley 5—A both occupy the full width of the larger opening. Although meters marked 10, 11 and 12, known as General-Electric I—14, Sangamo H—2 and Duncan M² respectively, have wider terminal chambers than the others, it will be seen that these meters also occupy the full width of the respective openings 5 by virtue of the curvature at the lower corners of their terminal chambers. The terminal chamber of meter No. 14, known as Westinghouse O. B., occupies the whole of the interior or smaller knockout opening 6 which, as above stated, is specially made for this small sized meter. In each case the reducer plate has been set to suit the depth of its associated terminal chamber and the combination of this plate with the knockouts thus affords a complete and practical adaptation of the box to any of the standard meters. It will be appreciated that if there were other meters having still different shapes or sizes of terminal chambers, further knockout sections could be formed in the end wall to accommodate their width, the reducer plate being used as necessary for adjusting the depth of the opening to suit the particular chamber. For chambers of greatest depth of no reducer plate need be used, if the depth of the largest knockout opening has been made of proper value.

When the described end wall structure has been used for adapting a box to a particular meter and it is thereafter desired to close up the end of the box completely, a supplemental closure plate can be employed for the purpose, and can be clamped in position by the screws 8. A simple rectangular plate of proper dimensions can be used for this purpose, or a plate of the shape indicated at 15 in Figures 5 and 6 can be used. This plate is adapted to be slipped in between the wall and the reducer plate and clamped in place by the latter, Fig. 5. The open slots 16 are for accommodating the clamp screws 8. This same closure plate is so constructed that it can be used to re-adapt a box to a Westinghouse O. B. meter (shown at 14) when necessary, as, for instance, after the large knockout 5ª has been removed in accommodation to one of the larger meters. For this purpose it is provided with a knockout section 17 of the same dimensions as the knockout 6ª, and by the removal of this knockout 17, the box will obviously be adapted to the smaller size terminal chamber and give the same protection against tampering, as was afforded by the adjustment represented at 14 in Fig. 4. The closure plate 15 also has the semi-circular notch in its outer edge to accommodate the box seal.

Figures 7, 8 and 9 illustrate a modification of the adjustment and clamping means for the reducer plate, intended to make it even more difficult to loosen the plate from outside the box. In this case the bolt heads are on the outside of the box, but keyed to it by means of the key-lugs 18 formed on the bolt shanks. The key-lugs fit in any one of the series of keyways formed in the slots of the reducer plate according to the several required adjustments, so that when in place, with the nuts and lock washers applied, the bolts cannot be turned or unscrewed from outside the box even though their heads are externally exposed. Ordinarily such precautions as this are not necessary, and accordingly the simpler form of adjustment first above described is preferred.

From the foregoing description, it will be observed that the single wall structure, having the appropriate opening or openings, and the reducer plate, takes the place of the whole series of end walls or adapter plates heretofore considered necessary for the accommodation of a given switch box to different meters, and the saving of expense above referred to will now be apparent. It will be understood also, as above stated, that the form of the invention illustrated in the drawings is the preferred form, and that the principles illustrated by it can be embodied in other and different forms without departing from the sense of the following claims:

Claims:

1. A meter protector casing including a meter adapting end wall having an aperture of a size and shape to substantially fit the largest of a series of meter terminal casings, a movable plate, and means for securing the movable plate to the said wall in selected positions with reference to the said aperture to vary the size thereof to fit the other meters of the series.

2. The combination of the end wall of a meter-protecting service box having an opening therein, the width of which is suited to be completely occupied by any one of several standard meter terminal chambers, and the depth of which is adapted to accommodate the terminal chamber of greatest depth, a reducer plate, and means connecting the reducer plate with the end wall and permitting the adjustment of the said plate depthwise of said opening to make the same conform to a chamber of less depth.

3. The combination of a meter-protecting switch box having an end wall directly and removably connected to the ends of the box side walls, said end wall having an opening therein, the width of which is adapted to be completely occupied by any one of several different styles of meter terminal chambers and the depth of which is adapted to accommodate the chamber of greatest depth, a reducer plate, and an adjustable bolt and slot connection between the said reducer plate and the said end wall, whereby the reducer plate is adjustable to make the end wall opening conform to a terminal chamber of less depth.

4. The combination of claim 2 in which the end wall containing the opening is removable from the box body to facilitate the making of the meter connections.

5. The combination of claim 2 in which the reducer plate is secured to the end wall by means operable only on the inner side of said wall.

6. The combination of claim 2 in which the opening in the end wall is initially occupied by a knockout section.

7. The combination of claim 2 in which the end wall is provided with more than one knockout section, one of which conforms to the dimensions referred to in claim 2, and the other of which conforms to a meter terminal chamber of different dimension.

8. The combination of claim 1 in which the opening referred to is initially occupied by a knockout section and said knockout section contains a similar knockout section.

9. The elements of claim 1 in further combination with a closure plate adapted to be secured in place over the meter-receiving opening.

10. The elements of claim 1 in further combination with a closure plate adapted to be secured in place over the meter receiving opening by the same means which connects the reducer plate with the end wall.

11. The elements of claim 1 in further combination with a closure plate adapted to be secured over the meter-receiving opening, said closure plate having a knockout section.

12. The elements of claim 1 in further combination with a knockout section initially filling the opening and a third plate adapted to be secured in place over the said opening.

In testimony whereof, I have signed this specification.

JOSEPH SACHS.